United States Patent
Han et al.

(10) Patent No.: US 7,916,242 B2
(45) Date of Patent: Mar. 29, 2011

(54) PRISM SHEET HAVING INCLINED RIDGES AND LIQUID CRYSTAL DISPLAY USING THE SAME

(75) Inventors: Young Soo Han, Uiwang-si (KR); Jun Hyeak Choi, Uiwang-si (KR); Seok Hoon Jang, Uiwang-si (KR); Ju Yeol Choi, Uiwang-si (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 218 days.

(21) Appl. No.: 12/230,655

(22) Filed: Sep. 3, 2008

(65) Prior Publication Data

US 2009/0059128 A1 Mar. 5, 2009

(30) Foreign Application Priority Data

Sep. 3, 2007 (KR) .................. 10-2007-0089155

(51) Int. Cl.
  *G02F 1/1335* (2006.01)
(52) U.S. Cl. .................................................... 349/62
(58) Field of Classification Search .................. None
  See application file for complete search history.

(56) References Cited

U.S. PATENT DOCUMENTS

| 7,154,572 | B2* | 12/2006 | Lee et al. | 349/61 |
| 7,488,095 | B2* | 2/2009 | Shim et al. | 362/362 |
| 7,540,646 | B2* | 6/2009 | Naoi | 362/558 |
| 2008/0225202 | A1* | 9/2008 | Joo et al. | 349/64 |
| 2010/0066942 | A1* | 3/2010 | Teragawa | 349/62 |
| 2010/0103351 | A1* | 4/2010 | Han et al. | 349/65 |

* cited by examiner

*Primary Examiner* — Sung H Pak
(74) *Attorney, Agent, or Firm* — Lee & Morse, P.C.

(57) ABSTRACT

A prism sheet includes a transparent base film with first and second surfaces and an optical refracting part with a plurality of prism units on the second surface, wherein the prism units are integral with the transparent base film, each prism unit having a predetermined height and extending along a first direction on the second surface of the transparent base film, wherein each prism unit includes a ridge extending along the first direction, a distance along a normal between the second surface of the transparent base film and the ridge defining the predetermined height of the prism unit, and wherein at least two prism units include ridges inclined at a predetermined angle other than zero with respect to the second surface of the transparent base film, the inclined ridges being unevenly distributed on the second surface of the transparent base film.

20 Claims, 6 Drawing Sheets

PRISM SHEET HAVING INCLINED RIDGES AND LIQUID CRYSTAL DISPLAY USING THE SAME

BACKGROUND OF THE INVENTION

1. Field of the Invention

Example embodiments relate to a prism sheet and to a liquid crystal display (LCD) using the same. More particularly, example embodiments relate to a prism sheet having a plurality of prism units with inclined ridges and to an LCD using the same.

2. Description of the Related Art

A LCD refers to a display device displaying text or images by application of an electric field to liquid crystals, which have an intermediate phase between a liquid and a solid, arranged between two glass substrates acting as electrodes. The liquid crystals may be arranged in a predetermined pattern between the two glass substrates, so application of the electric field to the liquid crystals may modify alignment of the liquid crystals to adjust transmittance of light therethrough. The emitted light may display images on a liquid crystal panel of the LCD.

A conventional LCD may include a backlight unit as a light source for emitting light through the liquid crystals. A conventional backlight unit of a LCD may include a light source, a light guide plate, at least one prism sheet, and, e.g., a protector sheet, sequentially stacked on each other in a case.

However, moisture may penetrate the case of the backlight unit of the LCD. When moisture forms droplets on a predetermined portion of the backlight unit, refraction or diffusion of light may occur thereon, thereby reducing display properties of the LCD, e.g., decreased visibility or optical concealment of the backlight unit.

SUMMARY OF THE INVENTION

Example embodiments are therefore directed to a prism sheet and to a LCD using the same, which substantially overcome one or more of the disadvantages of the related art.

It is therefore a feature of an example embodiment to provide a prism sheet with inclined ridges capable of discharging moisture in a backlight unit.

It is another feature of an example embodiment to provide a LCD with a prism sheet having inclined ridges capable of discharging moisture in a backlight unit thereof.

At least one of the above and other features and advantages of the present invention may be realized by providing a prism sheet, including a transparent base film, the transparent base film having first and second surfaces opposite each other and parallel to each other, and an optical refracting part on the second surface of the transparent base film, the optical refracting part including a plurality of prism units, wherein the plurality of prism units are integral with the transparent base film, each prism unit having a predetermined height and extending along a first direction on the second surface of the transparent base film, the predetermined height being perpendicular to the first direction and to the second surface of the transparent base film, wherein each prism unit includes a ridge extending along the first direction, a distance along a normal between the second surface of the transparent base film and the ridge defining the predetermined height of the prism unit, and wherein at least two prism units include ridges inclined at a predetermined angle with respect to the second surface of the transparent base film, the predetermined angle being other than zero, and the inclined ridges being unevenly distributed on the second surface of the transparent base film.

The first surface of the transparent base film may be substantially flat. All prism units may include ridges inclined at the predetermined angle with respect to the second surface of the transparent base film. The prism units may include first prisms with ridges inclined at the predetermined angle with respect to the second surface of the transparent base film and second prisms with ridges substantially parallel to the second surface of the transparent base film, the first and second prisms being unevenly distributed on the second surface of the transparent base film. Adjacent ridges may be inclined at different predetermined angles. Adjacent ridges may be inclined in opposite directions. The predetermined angle may be smaller than about 5°. The transparent base film may include a transparent synthetic resin. Each of the prism units may include at least two optical planes capable of refracting light, the two optical planes being non-parallel to each other. The prism units may have a triangular cross-section, a semi-circular cross-section, or a trapezoidal cross-section. The prism units may have a triangular cross-section, a vertex of the triangular cross-section facing the first surface of the transparent base film having an angle of about 30° to about 120°.

Adjacent prism units may be in direct contact with each other. Adjacent prism units may be arranged at constant intervals to have a constant separation plane therebetween. The predetermined height of each prism unit may be about 50% to about 100% of a pitch of the prism units. The prism units may include optical diffusers in lower portions of the prism units. The optical diffusers may be unevenly distributed on the prism units, the optical diffuser covering about 50% or more of a surface area of the lower portions of the prism units and extending to about half or less of the predetermined height of the prism units. The optical diffusers may have a circular lens shape, a diameter of the circular lens shape being about 0.01 times to about 0.9 times of a pitch of the prism units. The optical diffusers may have an elliptical lens shape, a major radius of the elliptical lens shape being about 0.01 times to about 0.9 times of a pitch of the prism units.

At least one of the above and other features and advantages of the present invention may be realized by providing a backlight unit for a display device, including a light guide plate, a light source adjacent to the light guide plate, and a prism sheet on the light guide plate, the prism sheet including a transparent base film, the transparent base film including first and second surfaces opposite each other and parallel to each other, and an optical refracting part on the second surface of the transparent base film, the optical refracting part including a plurality of prism units, wherein the prism units are integral with the transparent base film, each prism unit having a predetermined height and extending along a first direction on the second surface of the transparent base film, the predetermined height being perpendicular to the first direction and to the first surface of the transparent base film, wherein each prism unit includes a ridge extending along the first direction, a distance along a normal between the first surface of the transparent base film and the ridge defining the predetermined height of the prism unit, and wherein at least two prism units include ridges inclined at a predetermined angle with respect to the first surface of the transparent base film, the predetermined angle being other than zero, and the inclined ridges being unevenly distributed on the second surface of the transparent base film.

At least one of the above and other features and advantages of the present invention may be realized by providing a liquid crystal display, including a panel unit including an upper substrate with a color filter and a lower substrate with a thin film transistor, and a backlight unit, the black light unit including a light guide plate, a light source adjacent to the light guide plate, and a prism sheet on the light guide plate, the prism sheet having a transparent base film, the transparent base film including first and second surfaces opposite each other and parallel to each other, and an optical refracting part on the second surface of the transparent base film, the optical refracting part including a plurality of prism units, wherein the prism units are integral with the transparent base film, each prism unit having a predetermined height and extending along a first direction on the second surface of the transparent base film, the predetermined height being perpendicular to the first direction and to the first surface of the transparent base film, wherein each prism unit includes a ridge extending along the first direction, a distance along a normal between the first surface of the transparent base film and the ridge defining the predetermined height of the prism unit, and wherein at least two prism units include ridges inclined at a predetermined angle with respect to the first surface of the transparent base film, the predetermined angle being other than zero, and the inclined ridges being unevenly distributed on the second surface of the transparent base film.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
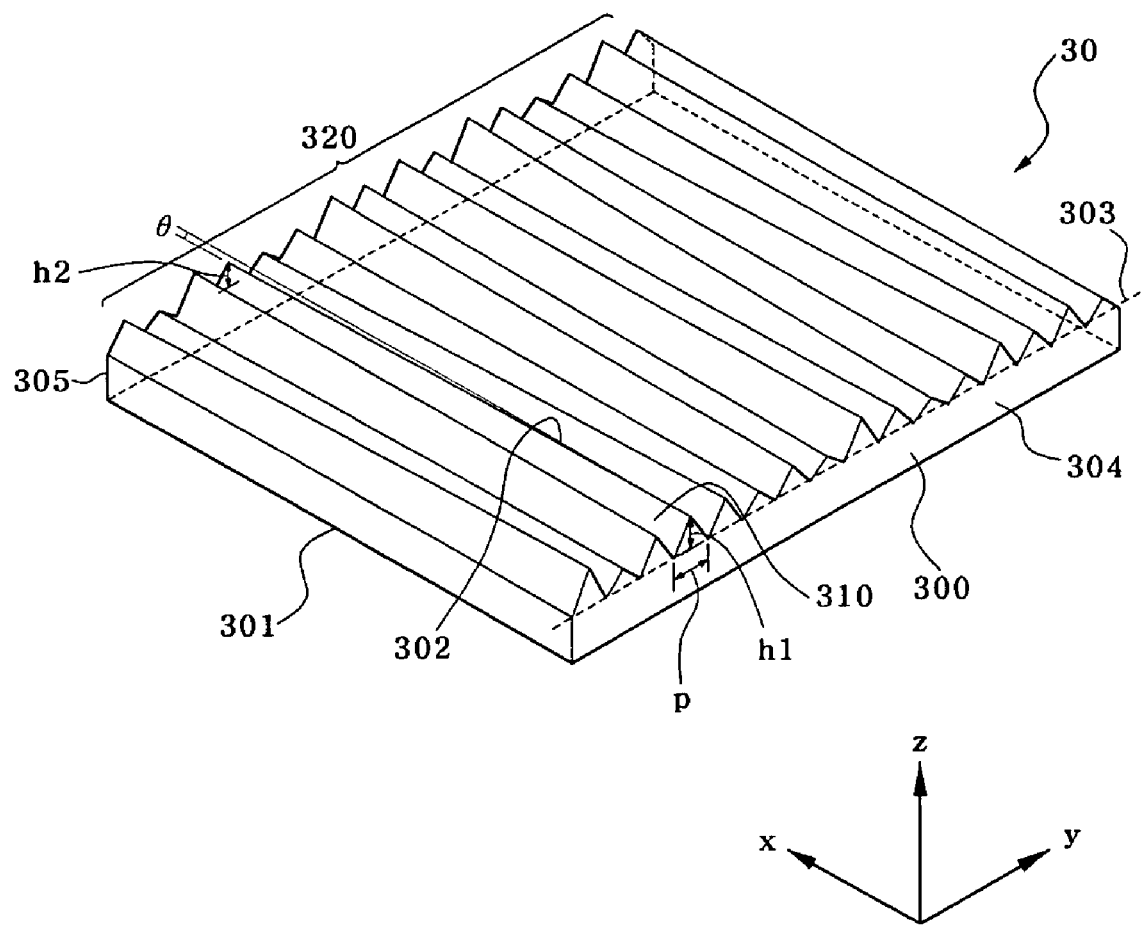
FIG. 1 illustrates a perspective view of a prism sheet according to an example embodiment of the present invention.

Korean Patent Application No. 10-2007-0089155, filed on Sep. 3, 2007, in the Korean Intellectual Property Office, and entitled: "Prism Sheet Having Inclined Ridges and Liquid Crystal Display Using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an nth member, where n is greater than 3, whereas the expression "at least one selected from the group consisting of A, B, and C" does not.

Exemplary embodiments of the present invention will hereinafter be described in detail with reference to the accompanying drawings. FIG. 1 illustrates a perspective view of a prism sheet according to an exemplary embodiment. It is noted that the prism sheet may improve brightness of light by refracting and/or collecting light incident thereon, e.g., collecting light passing through a diffuser sheet.

As illustrated in FIG. 1, a prism sheet 30 may include a base film 300 with first and second surfaces 301 and 303 opposite each other. The first surface 301 of the base film 300 may be a substantially flat surface. The second surface 303 of the base film 300 may include an optical refracting part 320 arranged opposite the first surface 301, e.g., the optical refracting part 320 may be positioned on the second surface 303. The first and second surfaces 301 and 303 may be parallel to each other, e.g., both may be in the xy-plane.

The base film 300 may be a base layer of the prism sheet 30, and may be formed of any suitable transparent material, e.g., a transparent synthetic resin, a glass material, a transparent metallic thin film, and so forth. For example, the transparent synthetic resin may include one or more of polyethylene, polypropylene, polycarbonate, and so forth. The base film 300 may have any suitable thickness along the z-axis, e.g., the base film 300 may have a thickness on a micrometer scale.

The optical refracting part 320 of the base film 300 may include a plurality of prism units 310 on the second surface 303. The optical refracting part 320 may refract light passing through the base film 300 to adjust direction of the passing light.

The prism units 310 of the optical refracting part 320 may be integral with the base film 300, and may extend along a first direction, e.g., along the x-axis, on the second surface 303, as illustrated in FIG. 1. The prism units 310 of the optical refracting part 320 may be uniformly arranged at a constant pitch (p), i.e., a sum of a width of a single prism unit 310 along the y-axis and a distance between two adjacent prism units 310 along the y-axis. Accordingly, widths of the prism units 310 may be uniform along the y-axis. For example, as illustrated in FIG. 1, the prism units 310 may be arranged to be immediately adjacent to each other, i.e., substantially no interval between adjacent prism units 310, so the pitch p of the prism units 310 may substantially equal the width of a single prism unit 310, i.e., adjacent prism units 310 may directly contact each other. In another example, adjacent prism units 310 may be spaced apart from each other, i.e., may have a separation plane defined between adjacent prism units 310, so the pitch p of the prism units 310 may be larger than the width of a single prism unit 310. Adjacent prism units 310 may be spaced apart from each other, e.g., when there is a need to ensure straightness of light rather than refractivity of light.

The prism units 310 may have predetermined cross-sections in a plane perpendicular to a plane of the first surface 301 of the base film 300. For example, if the first surface 301 of the base film 300 is arranged in the xy-plane, as illustrated in FIG. 1, the predetermined cross-sections of the prism units 310 may be in the zy-plane. The predetermined cross-sections of the prism units 310 may have any suitable polygonal or circular shape, e.g., a triangular cross-section, a semicircular cross-section, i.e., a "semi cylindrical" cross-section or a lenticular cross-section, a trapezoidal cross-section.

For example, the prism units 310 of the optical refracting part 320 may have a cross-section with two or more optical planes capable of refracting light, so the at least two optical planes may be unparallel to each other, i.e., refract unparallel light. For example, as illustrated in FIG. 1, the prism units 310 of the optical refracting part 320 may have triangular cross-sections, e.g., pyramidal prisms with rectangular bases, arranged adjacent to each other along a second direction, e.g., the y-axis. It is noted that the shape of the prism units 310 may be determined with respect to desired characteristics of a device including the prism sheet 30, e.g., type of display device, a desired viewing angle, screen size, and so forth. When the prism units 310 have a triangular cross-section, the vertex angle, i.e., an angle facing the second surface 303, may be about 30° to about 120°.

The at least two of the optical planes of each prism unit 310 may contact each other to define a ridge 302 along the first direction. For example, as illustrated in FIG. 1, the prism units 310 may have rectangular bases with triangular cross sections to form ridges 302 along the first direction, e.g., along the x-axis. The ridges 302 may be inclined at a predetermined angle with respect to the second surface 303 of the base film 300, so the prism units 310 may have non-uniform heights as measured along a normal between the second surface 303 of the base film 300 and the ridges 302.

More specifically, each one of the prism units 310 may include a first height h1 and a second height h2 different from the first height h1. The first height h1, as illustrated in FIG. 1, may be defined as a distance between the second surface 303 and a vertex of a respective prism unit 310 on a first side surface 304, i.e., starting point of the prism 310. The second height h2, as illustrated in FIG. 1, may be defined as a distance between the second surface 303 and a vertex of a respective prism unit 310 on a second side surface 305, i.e., a terminal point of the prism 301. The first and second side surfaces 304 and 305 may be parallel to each other, and may be perpendicular to the first surface 301, e.g., the first and second side surfaces 304 and 305 may be arranged in the zy-plane. The first and second side surfaces 304 and 305 may be arranged opposite each other.

Since the first and second heights h1 and h2 in each prism unit 310 are different, a line connecting vertices corresponding to the first and second heights h1 and h2 of each prism unit 310 may define the ridge 302 to be inclined at the predetermined angle with respect to the second surface 303 of the base film 300. A single ridge 302 of a single prism unit 310 may have a constant inclination angle ($\theta$). It is noted, however, that adjacent ridges 302, i.e., ridges of adjacent prism units 310, may have different inclination angles ($\theta$). Ridges 302 with different inclination angles ($\theta$) may be distributed in any suitable pattern on the second surfaces 303, e.g., ridges 302 with different inclination angles ($\theta$) may be distributed unevenly, i.e., randomly, on the second surface 303, ridges 302 with different inclination angles ($\theta$) may be distributed in a an alternating pattern, all ridges 302 may have same inclination angles ($\theta$), and so forth.

An inclination angle ($\theta$) of the ridge 302 may be defined as an angle between the ridge 302 and the second surface 303, i.e., an angle formed between the inclined line connecting the vertices corresponding to the first and second heights h1 and h2 of each prism unit 310 and the x-axis. The height difference between the first and second heights h1 and h2 may be adjusted, so the inclination angle ($\theta$) may be larger than zero and smaller than about 5°. The inclination angle ($\theta$) may be positive or negative to define a slope of a ridge 302 in a different direction with respect to the x-axis. An inclination angle ($\theta$) above about 5° may deteriorate light uniformity.

Each of the first and second heights h1 and h2 of the prism units 310 may equal about 50% of the pitch p to about 100% of the pitch p of the prism units 310. For example, when the prism units are arranged at a pitch of 60 $\mu$m, the first and second heights h1 and h2 may equal about 30 $\mu$m to about 60 $\mu$m. Unrestricted first and second heights h1 and h2, i.e., heights outside the above range, may deteriorate light uniformity.

A prism sheet 30 with inclined ridges 302 according to example embodiments may facilitate formation of a gap between the prism sheet 30 and, e.g., a functional sheet thereon. For example, arrangement of a substantially flat functional sheet on the prism sheet 30, e.g., in direct contact with some vertices of the prism units 310, may provide a gap between the functional sheet and vertices not in contact therewith, i.e., lower vertices as compared with vertices in contact with the protection sheet. Formation of the gap between the prism sheet 30 and the functional sheet thereon, e.g., a protector film or a polarizer film, in an LCD backlight unit may facilitate efficient discharge of moisture from the backlight unit to the outside through the gap.

Figure 2:
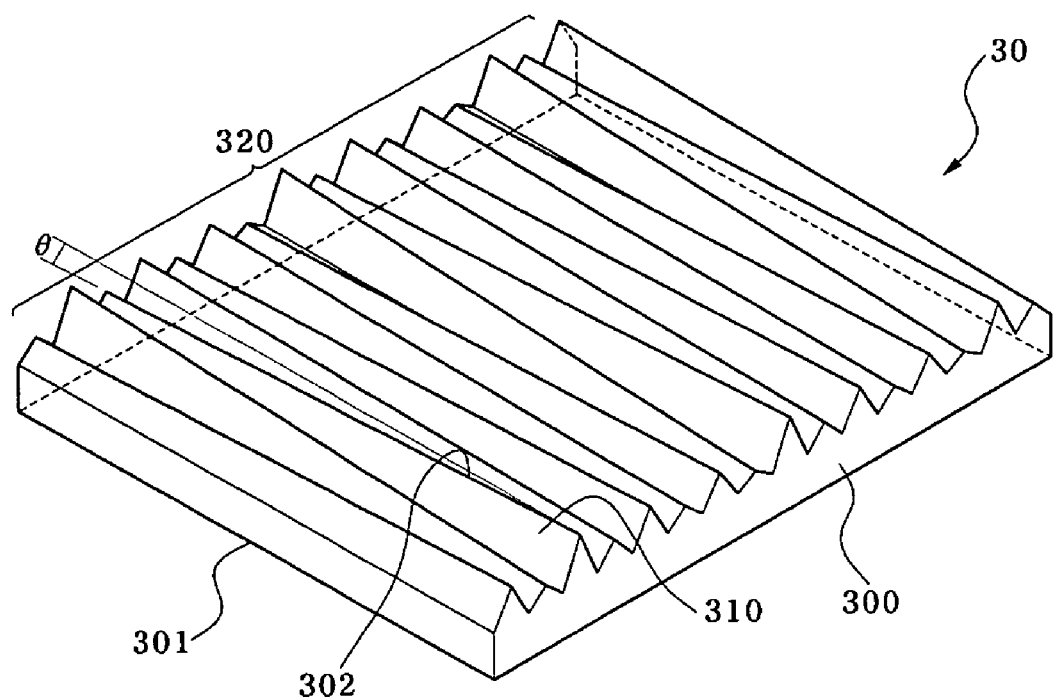
FIG. 2 illustrates a perspective view of a prism sheet according to another example embodiment of the present invention.

According to another example embodiment illustrated in FIG. 2, a prism sheet may be substantially the same as the prism sheet 30 described previously with reference to FIG. 1, with the exception of including prism units 310 arranged to have ridges 302 inclined in opposite directions. For example, as illustrated in FIG. 2, adjacent ridges 302 may be inclined in opposite directions to form an alternating pattern. In other words, a first prism unit 310 may have a positive inclination angle ($\theta$), e.g., a vertex in the first side surface 304 may be higher than a corresponding vertex in the second side surface 305, and a second prism unit 310 adjacent to the first prism unit 310 may have a negative inclination angle ($\theta$), e.g., a prism unit 410 immediately adjacent to the first prism unit 310, a vertex in the first side surface 304 may be lower than a corresponding vertex in the second side surface 305. It is noted, however, that other configuration of the ridges 302 with respect to inclination direction thereof, e.g., every two adjacent ridges 302 may have a same inclination direction, the ridges 302 may be arranged to have random inclination directions, and so forth, are within the scope of the present invention. It is noted that positive and negative inclinations direction may be defined with respect to positive and negative inclination angles ($\theta$).

Formation of a prism sheet with ridges inclined in opposite directions may improve uniformity of a gap between the prism sheet and an adjacent functional sheet in a backlight unit of a LCD device. Accordingly, moisture discharge and overall uniformity of planar light may be improved.

Figure 3:
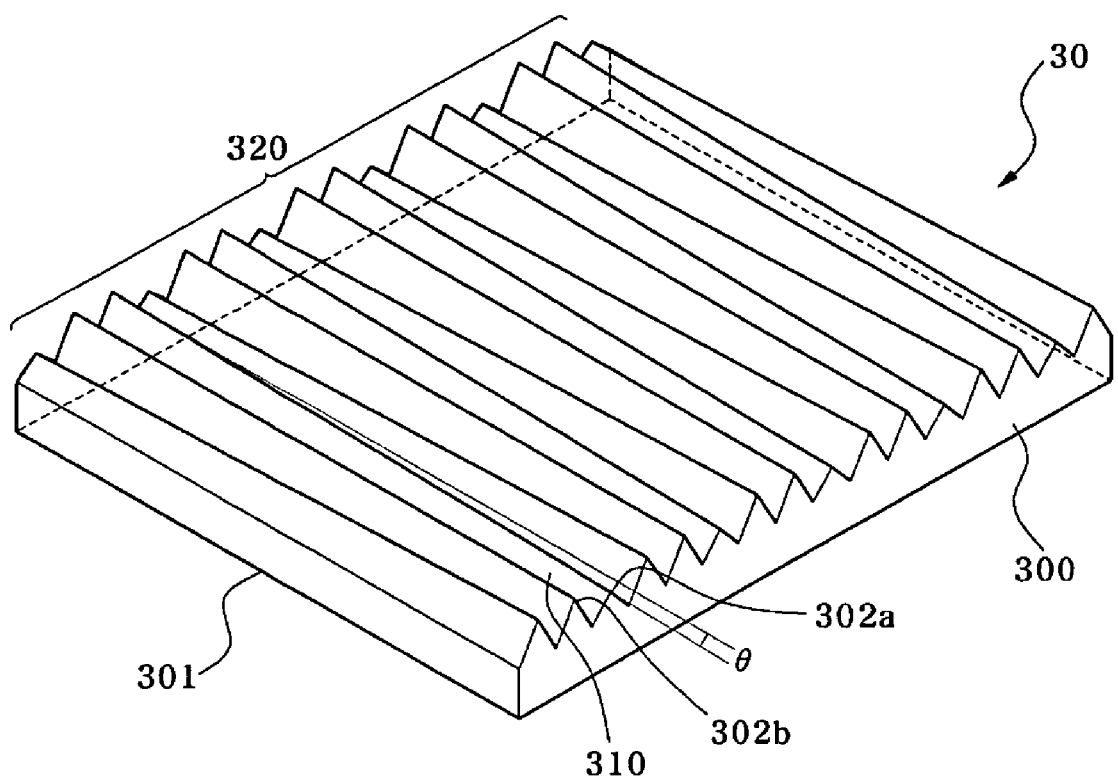
FIG. 3 illustrates a perspective view of a prism sheet according to another example embodiment of the present invention.

According to yet another example embodiments illustrated in FIG. 3, a prism sheet may be substantially the same as the prism sheet 30 described previously with reference to FIG. 1 or the prism sheet described previously with reference to FIG.

2, with the exception of including prism units 310 arranged to have both inclined ridges 302 and non-inclined ridges, i.e., ridges having substantially same first and second heights h1 and h2. Accordingly, as illustrated in FIG. 3, the prism units 310 may have first ridges 302a formed to be parallel to the first surface 301 of the base film 30 and second ridges 302b inclined with respect to the first surface 301, i.e., ridges 302b having positive inclination angles (θ) and/or ridges 302b having negative inclination angles (θ). As a result, the backlight unit including the prism sheet illustrated in FIG. 3 may have improved moisture discharge capability and enhanced overall uniformity of planar light.

Figure 4:
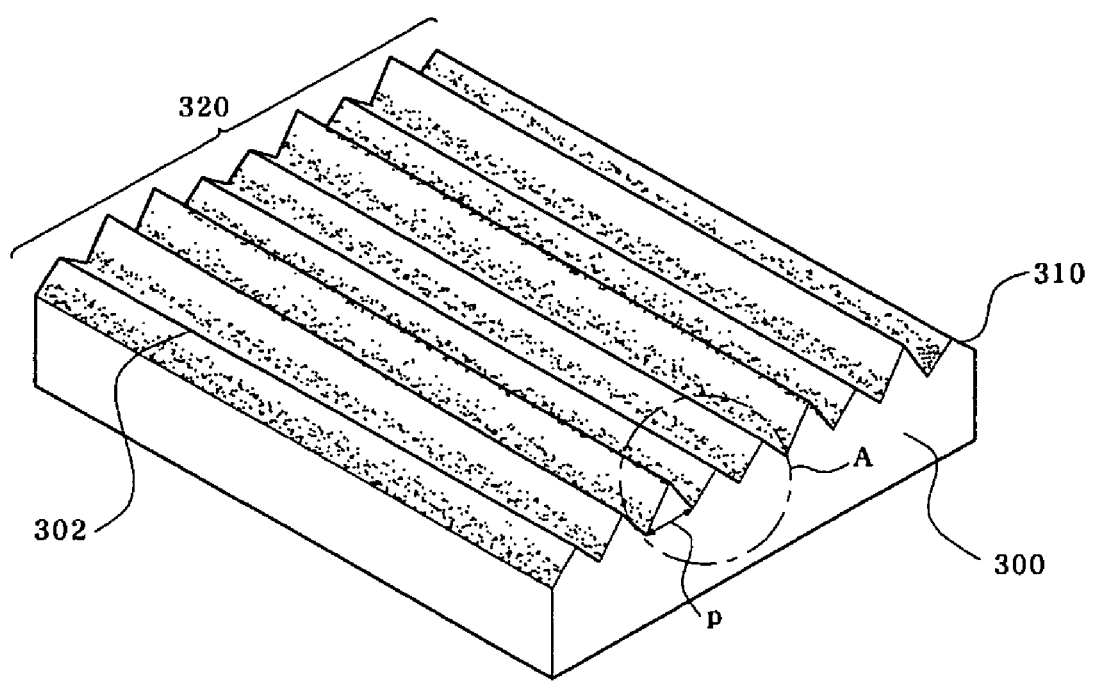
FIG. 4 illustrates a perspective view of a prism sheet according to another example embodiment of the present invention.
Figure 5:
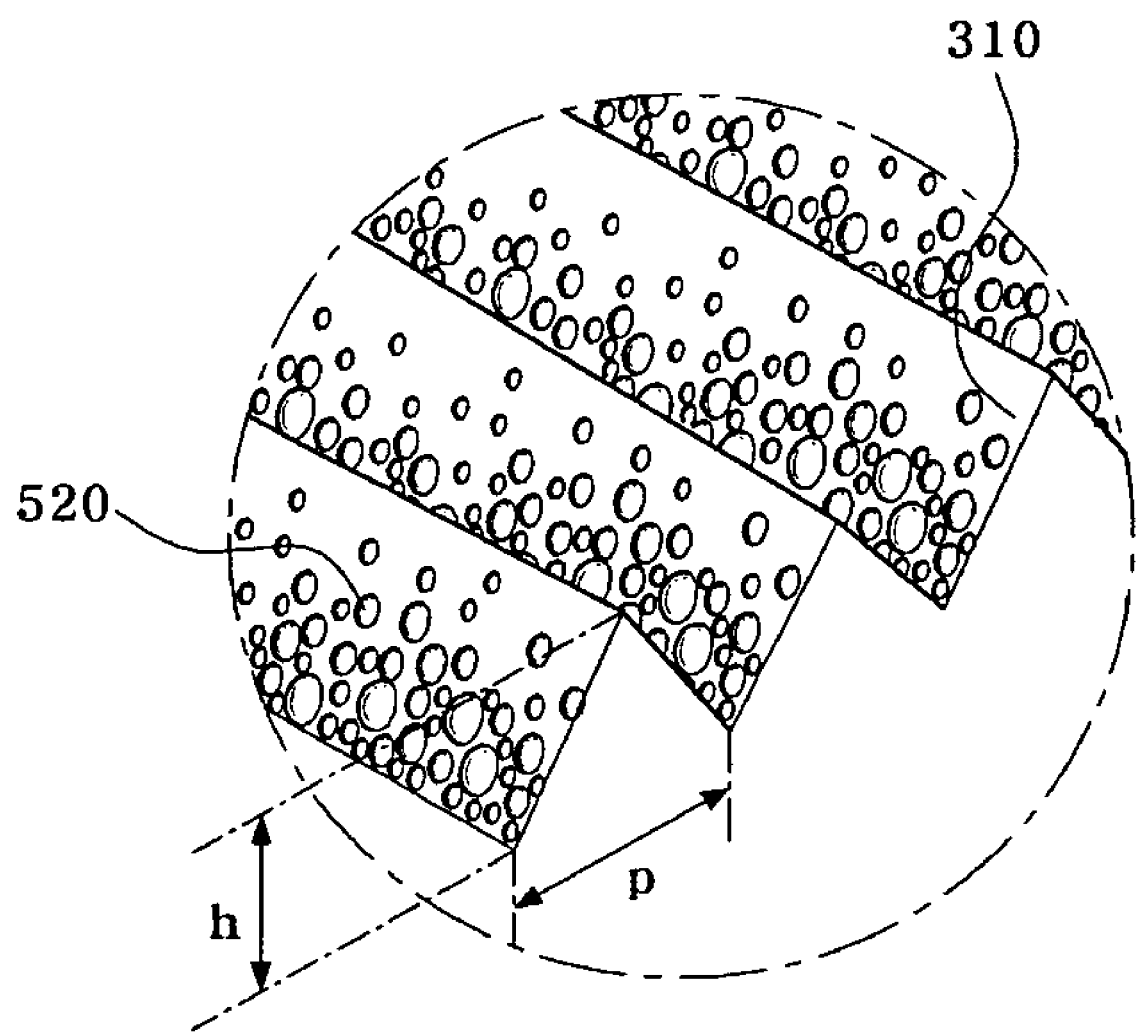
FIG. 5 illustrates an enlarged view of region A in FIG. 4.
Figure 6:
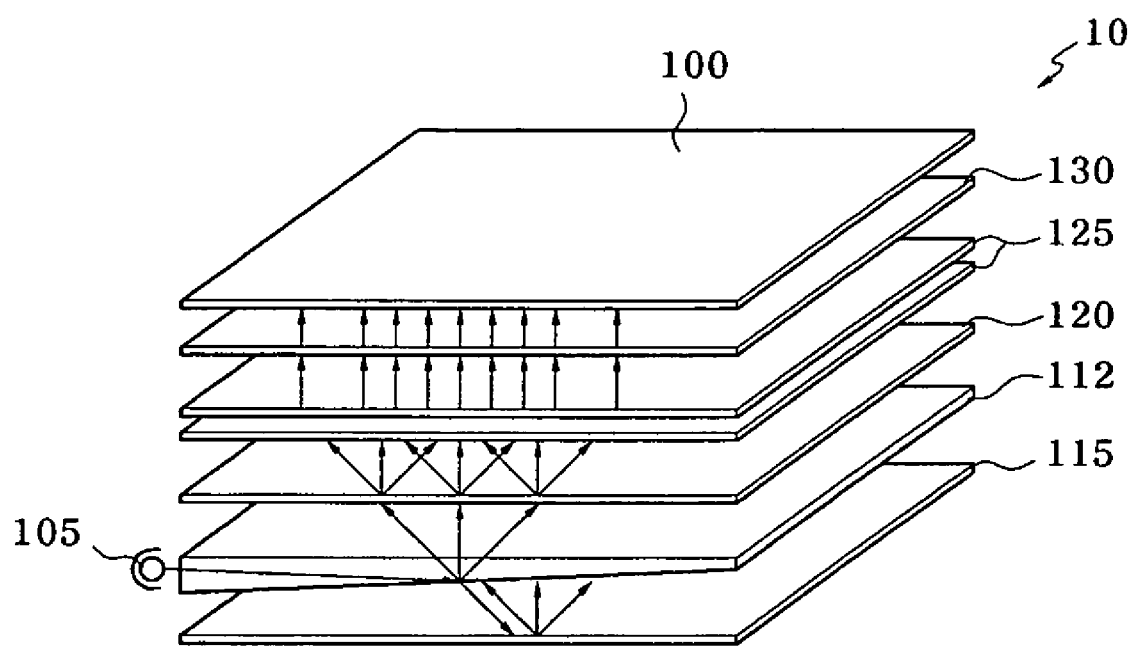
FIG. 6 illustrates an exploded perspective view of a LCD backlight unit including a prism sheet according to an example embodiment of the present invention.

According to still another example embodiments illustrated in FIGS. 4-5, a prism sheet may be substantially the same as either of the prism sheets described previously with reference to FIGS. 1-3, with the exception of including optical diffusers on the prism sheet to provide diffusion as well as refraction. FIG. 4 illustrates a perspective view of a prism sheet, while FIG. 6 illustrates an enlarged view of region A in FIG. 4.

As illustrated in FIGS. 4-5, the prism sheet may include optical diffusers 520 randomly distributed on the optical refracting part 320. The optical diffusers 520 may have, e.g., a circular lens shape and/or an elliptical lens shape.

The optical diffusers 520 may be a plurality of lens-shaped protrusions and/or depressions with circular edges. The optical diffusers 520 may be distributed over 50% or more of the surface area of the valleys between adjacent prism units 310, and may extend to half or less of a height of each prism unit 310. The optical diffusers 520 may contact each other at a lower portion of the optical refracting part 320, i.e., near a valley between adjacent prism units 310, and/or the optical diffusers 520 may be spaced apart from each other and substantially cover the entire surface of the optical refracting part 320. For example, as illustrated in FIG. 5, the optical diffusers 520 may contact each other at a lower portion of the optical refracting part 320 and may spread apart from each other as a distance between the optical diffusers 520 and the lower portion of the optical refracting part 320 increases.

The lens shape, e.g., circular or elliptical, of the optical diffusers 520 may have a smaller size than a size of the optical refracting part 320. For example, if the optical diffusers 520 are circular, a ratio of a diameter of a circular lens to the pitch p of the prism unit 310 may be about 0.01 to about 0.9. Similarly, a ratio of a major radius of an elliptical lens to the height of the prism unit 310 may be about 0.01 to about 0.9. It is noted that a height of the prism unit 310 with respect to a size ratio refers to a height of the prism unit 310 as measured at the position of the respective optical diffuser 520, i.e., optical diffusers may be larger at portions of prism units 310 having higher heights. The ratios are determined by considering diffusion and refractivity of light in a part of the prism sheet subjected to optical diffusion.

The optical diffusers 520 may be formed to facilitate diffusion of a small amount of light on a surface of the optical refracting part 320. For example, a small amount of light of the light passing through the base film 300 and the optical refracting part 320 may be diffused through the optical diffusers 520, while permitting a brightness reduction ratio of refracted light to be maintained at about 5% to about 10%. Use of the prism sheet having the optical diffusers 520 may permit elimination of a conventional diffuser sheet.

An optical refracting part 320 of an optical sheet according to example embodiments may be formed by using a mold having engravings corresponding to the optical refracting part 320, i.e., a prism-engraved mold. A transparent film of a predetermined thickness may be pressed with the prism-engraved mold to form a prism-embossed pattern on a surface of the transparent film corresponding to the engraved prisms of the mold. Accordingly, the surface of the transparent film with the prism-embossed pattern, e.g., a top surface of the transparent film, may become the optical refracting part 320, and a surface of the transparent film opposite the optical refracting part 320, e.g., a bottom surface of the transparent film, may become the flat surface 301 of the base film 300.

When optical diffusers 520 are formed on the optical sheet, i.e., a prism sheet having the optical refracting part 320 and the optical diffusers 520 integrally formed therewith, the transparent film may be pressed by using a mold that has engraved prisms and concave-convex shapes formed on the surface of the engraved prisms. As such, the optical diffusers 520 may be formed simultaneously with the prism units 310 in the transparent film. For example, when the mold corresponding to the optical refracting part 320 may be subjected to a sandblasting process, peaks on the mold may be damaged, e.g., to form depressions therein. As such, when the mold is pressed into the transparent film, the peaks of the mold may correspond to valleys formed in the optical refracting part 320, thereby increasing concentration of the optical diffusers 520 in the valleys of the optical refracting part 320. A distribution density of the optical diffusers as mentioned above may control concentration of the optical diffusers 520 in the valleys between the prisms.

A backlight unit 10 of a LCD according to an example embodiment illustrated in FIG. 6 may include at least one prism sheet 125 according to example embodiments. As illustrated in FIG. 6, the backlight unit 10 may include a light source 105, a light guide plate 112, a reflector plate 115, a diffuser sheet 120, at least one prism sheet 125, and a protector sheet 130. The components of the backlight unit 10 may be sequentially stacked on top of each other by bonding, and may be sealed in a high vacuum state within a case (not shown).

The light source 105 may emit light. The light source 105 may be any suitable light source, e.g., a cold cathode fluorescence lamp (CCFL) that emits very bright white light while consuming little power.

The light guide plate 112 may be positioned at one side of the light source 105 below an LCD panel 100. As illustrated in FIG. 6, the light guide plate 112 may convert light emitted from the light source 105, e.g., linear light, into planar light, and may project the planar light toward the LCD panel 100.

The reflector plate 115 may be located at a rear of the light guide plate 112, i.e., the guide plate 112 may be between the reflector plate 115 and the LCD panel 100. The reflector plate 115 may reflect light emitted from the light source 105 toward the light guide plate 112.

The diffuser sheet 120 may be positioned above the light guide plate 112, i.e., the diffuser sheet 120 may be between the guide plate 112 and the LCD panel 100. Light emitted from the light guide plate 112 toward the diffuser sheet 120 may be provided uniformly toward the prism sheet 125.

At least one prism sheet 125 may be stacked on a light-exit surface of the light guide plate 112. The prism sheet 125 may include more than one prism sheets, e.g., two prism sheets 125. For example, if two prism sheets 125 are used, the prism sheets 125 may be arranged orthogonally to each other. The prism sheet 125 may improve light brightness by refracting and collecting light that tends to undergo a rapid decrease in brightness due to diffusion in both directions, i.e., horizontal and vertical directions while passing through the diffuser sheet 120. The prism sheet 125 is substantially the same as the prism sheets described previously with reference to FIGS. 1-3 and, therefore, its detailed description will not be repeated.

The protector sheet 130 may be disposed on the prism sheet 125, and may protect the prism sheet 125 from damage, e.g., prevent scratches and Moire phenomenon that occurs when using the prism sheets 125 stacked in two layers in the horizontal and vertical directions.

A prism sheet according to example embodiments may include a plurality of prism units with inclined ridges, so a gap may be formed between the prism sheet and an adjacent element. Accordingly, since components of a backlight unit other than the prism sheet may have a substantially planar structure, discharge of moisture from a backlight unit of a LCD through the gap formed by the inclined ridges of the prism sheet may be facilitated. The inclined ridges may be capable of discharging moisture without deteriorating central brightness, transmittance and haze values of light transmitted therethrough when applied to the backlight unit of the LCD.

Therefore, even when the LCD backlight unit is subjected to a sealing process or is used for a long period of time, moisture may be removed from the backlight due to a gap formed by the inclined ridges of the prism sheet, thereby preventing or substantially minimizing reduction in visibility or optical concealment of the backlight unit. It is noted that a prism sheet according to example embodiments may be employed not only in an edge type display, i.e., a display including a light source at a lateral side of a light guide plate, but also in a direct type display, i.e., a display including a light source located directly at a rear surface of the light guide plate. Further, the prism sheet may be used regardless of a type of light source of the LCD, e.g., a cold cathode fluorescence lamp (CCFL), a light emitting diode (LED), and so forth.

EXAMPLES

Example: a prism sheet was manufactured according to an example embodiment. Prism units of the prism sheet had a triangular cross section with a vertex angle of 90°, a pitch of 60 μm, a first height h1 of 30 μm, and a second height h2 of 32 μm. The prism units included ridges inclined in opposite direction and were distributed randomly over the optical refracting part.

Comparative Example: a prism sheet was manufactured to include prism units with triangular cross sections having vertex angles of 90°, a pitch of 60 μm, and a uniform height h of 30 μm, i.e., ridges of the prism units were substantially parallel to the flat surface of the prism sheet. The process of manufacturing of the comparative prism sheet was substantially the same as the process of manufacturing the prism sheet of the Example.

Measurement of Properties (1) Measurement of Surface Brightness: the prism sheets of the Example and Comparative Example were compared in terms of central brightness using BM-7 (Topcon Co., Japan). A backlight unit used for this measurement was Model 170EU-L31 manufactured for monitors. Results are reported in Table 1.

(2) Measurement of Haze Value and Transmittance: the prism sheets of the Example and Comparative Example were compared in terms of haze and transmittance values measured using a detector, NHD 5000W. For measurement of the haze value, each of the prism sheets was positioned such that a surface having the prism units was secured by a lower end of the detector and the lateral sides of the prisms faced the detector. Results are reported in Table 1.

(3) Moisture Discharge Capability: In application of the prism sheets of the Example and Comparative Example to a backlight unit BLU 154X-L06, i.e., a unit requiring two prism sheets and employed in notebook computers, the prism sheets were disposed such that prism units of a first prism sheet were perpendicular to prism units of a second prism sheet. That is, a first prism sheet, i.e., a lower prism sheet, was disposed to arrange the prism units thereof perpendicularly to a direction of the backlight unit and the second prism sheet, i.e., an upper prism sheet, was disposed to arrange the prism units along a horizontal direction of the backlight unit. Then, the backlight unit was operated for 96 hours in a temperature and humidity chamber, and was then subjected to appearance observation. The temperature and humidity chamber was maintained at 60° C. and at 75% humidity. Results are reported in Table 1.

TABLE 1

|  | Example | Comparative Example |
|---|---|---|
| Central Brightness (cd/m$^2$) | 2,171 | 2,178 |
| Transmittance (%) | 9.32 | 8.52 |
| Haze (%) | 91.24 | 90.24 |
| Wet-out | Good | Spots |

As shown in Table 1, the prism sheets of the Example exhibited a superior moisture discharge capability. In particular, after 96 hours at a humidity of about 75%, the prism sheets did not exhibit dew condensation or planar light spots, thereby supporting the assertion that prism sheets according to example embodiments impart superior moisture discharge capabilities to a backlight unit. As such, the prism sheets according to example embodiments may function not only as an optical refracting element but as a moisture discharge element as well. The prism sheets for an LCD backlight unit according to example embodiments may provide moisture discharge capabilities, while maintaining good brightness, transmittance, and haze values when applied to the backlight unit.

Accordingly, when applying the prism sheet according to example embodiments to an LCD backlight unit, the backlight unit exhibits a superior moisture discharge capability and can minimize generation of light spots. Further, the prism sheet may include optical diffusers, so that a conventional diffuser sheet may be eliminated from the backlight unit, thereby enabling reduction in manufacturing costs of the backlight unit and thickness of the light guide plate.

Example embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A prism sheet, comprising:
a transparent base film, the transparent base film including first and second surfaces opposite each other and parallel to each other; and
an optical refracting part on the second surface of the transparent base film, the optical refracting part including a plurality of prism units,
wherein the plurality of prism units are integral with the transparent base film, each prism unit having a predetermined height and extending along a first direction on the second surface of the transparent base film, the predetermined height being perpendicular to the first direction and to the second surface of the transparent base film;
wherein each prism unit includes a ridge extending along the first direction, a distance along a normal between the second surface of the transparent base film and the ridge defining the predetermined height of the prism unit; and wherein at least two prism units include ridges inclined at predetermined angles with respect to the second surface of the transparent base film, the predetermined angles being other than zero, and the inclined ridges being unevenly distributed on the second surface of the transparent base film along a second direction substantially perpendicular to the first direction.

2. The prism sheet as claimed in claim 1, wherein the first surface of the transparent base film is substantially flat, and the ridges of the prism units are substantially linear.

3. The prism sheet as claimed in claim 1, wherein the prism units include first prisms with ridges inclined at the predetermined angles with respect to the second surface of the transparent base film and second prisms having ridges substantially parallel to the second surface of the transparent base film, the first and second prisms being unevenly distributed on the second surface of the transparent base film.

4. The prism sheet as claimed in claim 1, wherein an entire length of each ridge along the first direction is inclined at a different predetermined angle than an adjacent ridge.

5. The prism sheet as claimed in claim 4, wherein adjacent ridges are inclined in opposite directions.

6. The prism sheet as claimed in claim 1, wherein the predetermined angle is smaller than about 5°.

7. The prism sheet as claimed in claim 1, wherein each of the prism units includes at least two optical planes capable of refracting light, the two optical planes being non-parallel to each other.

8. The prism sheet as claimed in claim 1, wherein the prism units have a triangular cross-section, a semicircular cross-section, or a trapezoidal cross-section.

9. The prism sheet as claimed in claim 1, wherein the prism units have a triangular cross-section, a vertex of the triangular cross-section facing the first surface of the transparent base film having an angle of about 30° to about 120°.

10. The prism sheet as claimed in claim 1, wherein adjacent prism units are in direct contact with each other.

11. The prism sheet as claimed in claim 1, wherein adjacent prism units are arranged at constant intervals to have a constant separation plane therebetween.

12. The prism sheet as claimed in claim 1, wherein the predetermined height of each prism unit is about 50% to about 100% of a pitch of the prism units.

13. The prism sheet as claimed in claim 1, wherein the prism units include optical diffusers in lower portions of the prism units between ridges of the prism units and the second surface of the transparent base film.

14. The prism sheet as claimed in claim 13, wherein the optical diffusers are unevenly distributed on the prism units, the optical diffuser covering about 50% or more of a surface area of the lower portions of the prism units and extending to about half or less of the predetermined height of the prism units.

15. The prism sheet as claimed in claim 13, wherein the optical diffusers have a circular lens shape, a diameter of the circular lens shape being about 0.01 times to about 0.9 times of a pitch of the prism units.

16. The prism sheet as claimed in claim 13, wherein the optical diffusers have an elliptical lens shape, a major radius of the elliptical lens shape being about 0.01 times to about 0.9 times of a pitch of the prism units.

17. A backlight unit for a display device, comprising:
a light guide plate;
a light source adjacent to the light guide plate; and
a prism sheet on the light guide plate, the prism sheet including a transparent base film having first and second surfaces opposite each other and parallel to each other, and an optical refracting part on the second surface of the transparent base film, the optical refracting part including a plurality of prism units, wherein the plurality of prism units are integral with the transparent base film, each prism unit having a predetermined height and extending along a first direction on the second surface of the transparent base film, the predetermined height being perpendicular to the first direction and to the second surface of the transparent base film;

wherein each prism unit includes a ridge extending along the first direction, a distance along a normal between the second surface of the transparent base film and the ridge defining the predetermined height of the prism unit; and wherein at least two prism units include ridges inclined at predetermined angles with respect to the second surface of the transparent base film, the predetermined angles being other than zero, and the inclined ridges being unevenly distributed on the second surface of the transparent base film along a second direction substantially perpendicular to the first direction.

18. A liquid crystal display, comprising:
a panel unit including an upper substrate with a color filter and a lower substrate with a thin film transistor; and
a backlight unit, the black light unit including a light guide plate, a light source adjacent to the light guide plate, and a prism sheet on the light guide plate, the prism sheet having a transparent base film, the transparent base film including first and second surfaces opposite each other and parallel to each other, and an optical refracting part on the second surface of the transparent base film, the optical refracting part including a plurality of prism units, wherein the plurality of prism units are integral with the transparent base film, each prism unit having a predetermined height and extending along a first direction on the second surface of the transparent base film, the predetermined height being perpendicular to the first direction and to the second surface of the transparent base film;

wherein each prism unit includes a ridge extending along the first direction, a distance along a normal between the second surface of the transparent base film and the ridge defining the predetermined height of the prism unit; and wherein at least two prism units include ridges inclined at predetermined angles with respect to the second surface of the transparent base film, the predetermined angles being other than zero, and the inclined ridges being unevenly distributed on the second surface of the transparent base film along a second direction substantially perpendicular to the first direction.

19. The prism sheet as claimed in claim 1, wherein the ridges of the prism units have different initial heights, each initial height being a distance between the second surface of the transparent base sheet and a vertex of a corresponding ridge as measured along a surface of the optical refracting part facing an exterior of the prism sheet.

20. The prism sheet as claimed in claim 1, wherein at least two inclined ridges having a same predetermined angle with respect to the second surface are unevenly distributed on the second surface of the transparent base film along the second direction with respect to each other.

* * * * *